US006813065B2

(12) United States Patent
Tsuzaki et al.

(10) Patent No.: US 6,813,065 B2
(45) Date of Patent: Nov. 2, 2004

(54) RAMAN AMPLIFIER AND OPTICAL COMMUNICATION SYSTEM

(75) Inventors: Tetsufumi Tsuzaki, Yokohama (JP); Motoki Kakui, Yokohama (JP); Shinji Ishikawa, Yokohama (JP); Masashi Onishi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 15 days.

(21) Appl. No.: 09/929,503

(22) Filed: Aug. 15, 2001

(65) Prior Publication Data

US 2002/0024722 A1 Feb. 28, 2002

(30) Foreign Application Priority Data

Aug. 18, 2000 (JP) .................................. 2000-248627

(51) Int. Cl.[7] .............................................. H01S 3/00
(52) U.S. Cl. ....................................................... 359/334
(58) Field of Search ............................... 359/334, 337.4

(56) References Cited

U.S. PATENT DOCUMENTS

| | | | | |
|---|---|---|---|---|
| 4,699,452 A | * | 10/1987 | Mollenauer et al. | 398/157 |
| 5,721,635 A | * | 2/1998 | Shigematsu et al. | 359/160 |
| 6,151,160 A | * | 11/2000 | Ma et al. | 359/124 |
| 6,172,803 B1 | * | 1/2001 | Masuda et al. | 359/334 |
| 6,191,877 B1 | * | 2/2001 | Chraplyvy et al. | 359/124 |
| 6,292,288 B1 | * | 9/2001 | Akasaka et al. | 359/124 |
| 6,304,368 B1 | * | 10/2001 | Hansen et al. | 359/134 |
| 6,307,984 B1 | * | 10/2001 | Watanabe | 385/24 |
| 6,320,695 B1 | * | 11/2001 | Tanaka et al. | 359/341.33 |
| 6,335,820 B1 | * | 1/2002 | Islam | 359/334 |
| 6,344,922 B1 | * | 2/2002 | Grubb et al. | 359/134 |
| 6,384,962 B1 | * | 5/2002 | Foursa et al. | 359/334 |
| 6,429,966 B1 | * | 8/2002 | Hazell et al. | 359/334 |
| 6,574,037 B2 | * | 6/2003 | Islam et al. | 359/334 |
| 2001/0014194 A1 | * | 8/2001 | Sasaoka et al. | 385/15 |
| 2002/0001123 A1 | * | 1/2002 | Miyakawa et al. | 359/334 |

OTHER PUBLICATIONS

Galeener et al. Applied Physics Letts. vol. 32, No. 1, Jan. 1, 1978.*

Miyakawa et al. OFCC '2000, Mar. 7–10, 2000, vol. 4.*

Davey et al. IEE Proceedings, vol. 136, Pt. J, No. 6, Dec. 1989.*

Dianov et al. Lasers and Electro–Optics Europe 2000, Sep. 10–15, 2000.*

Photonics DictionaryLaurin Publishing 1996–2004. Raman Effect.*

Yoshihiro Emori, and Shu Namiki, "100nm Bandwidth Flat Gain Raman Amplifiers Pumped And Gain–Equalized By 12–Wavelength–Channel WDM High Power Laser Diodes," OFC'99, 1999, PD19–1–PD19–3.

A.S. Kurkov, V.M. Paramonov, O.I. Medvedkov, S.A. Vasiliev, E.M. Dianov, "Raman Fiber Laser at 1.45 $\mu m$ : Comparison Of Different Schemes," OMB5–1, Optical Society of America, vol. 16, 1999, PP. 5–1–5–3.

* cited by examiner

Primary Examiner—Mark Hellner
(74) Attorney, Agent, or Firm—McDermott Will & Emery LLP

(57) ABSTRACT

Disclosed are a gain module and an optical communication system which have gain in a broad wavelength range and are of low cost. The gain module 10 has two optical fibers $11_1$ and $11_2$ which differ from each other with respect to the composition of their respective optical waveguide region and which are connected in series. Because they differ from each other with respect to the quantity of their respective Stokes shift, they have gain in a different wavelength, respectively. The signal lights are introduced into the input end 10a, amplified with the gain module 10 in a wide wavelength range where an optical fiber has a Raman amplification gain, and are emitted from the output end $10_b$.

15 Claims, 7 Drawing Sheets

RAMAN AMPLIFIER AND OPTICAL COMMUNICATION SYSTEM

BACKGROUND OF THE INVENTION

1. Field of the Invention

The present invention relates to a Raman amplifier that can compensate attenuation which a signal suffers when it is transmitted in an optical communication system.

2. Description of the Background Arts

In an optical communication system, a signal lights suffers attenuation when transmitted in an optical transmission line, and consequently its power decreases when it reaches a receiver. If the power of signal lights which have reached a receiver is less than a given value, the performance of normal optical communication cannot be achieved. Therefore, it is necessary to provide an optical amplifier between a transmitter and a receiver in order to compensate such transmission attenuation.

As for such optical amplifier, there are a rare earth element doped optical fiber amplifier using a rare-earth-doped optical fiber for amplification and a Raman amplifier using Raman amplification phenomenon in an optical fiber. The characteristic of the Raman amplifier is that its spectrum band having gain can be shifted by the wavelength of pump light.

In a Wavelength Division Multiplexing (WDM) optical communication system, a Raman amplifier is required to amplify signal lights in a wide spectrum band or a plurality of spectrum bands. For example, in Literature (1): [Y. Emori, et al., "100 nm bandwidth flat gain Raman amplifiers pumped and gain-equalized by 12-wavelength-channel WDM high power laser diodes", OFC '99, PD19 (1999), there is disclosed a Raman amplifier in which an attempt was made to expand the width of the wavelength having gain by introducing pump light of 12 different wavelengths into a single test fiber (i.e., an optical fiber for Raman amplification).

SUMMARY OF THE INVENTION

It is an object of the present invention to provide a gain module and a Raman amplifier of low cost and an optical communication system in which a wavelength width having gain is broad.

In order to achieve this object, a gain module according to the present invention is provided with (1) a plurality of optical fibers which differ from each other with respect to the composition of their respective optical regions and through which signal lights are amplified by stimulated Raman scattering and (2) one or more pump light sources which supply each of the optical fibers with pump light for Raman amplification. In this specification, a region (region inside the mode field diameter) in which optical power is equal to or more than $e^{-2}$ of the optical power in the core center is called an "optical region." The term "Raman amplification" as used herein means amplifying signal lights by stimulated Raman scattering.

In one embodiment of the present invention, the difference of the Stokes shift of optical fibers may be equal to or more than 200 cm$^{-1}$ or not less than 400 cm$^{-1}$. A plurality of optical fibers for Raman amplification may be connected in series or in parallel. The pump light source may supply pump light of a substantially identical wavelength or pump light of a different wavelength to each of the optical fibers. Also, the pump light source may supply pump light from one common pump light source. The optical region in some of the optical fibers may be doped with GeO$_2$ or P$_2$O$_5$.

An optical communication system according to an embodiment of the present invention is provided with optical transmission lines composed of a plurality of optical fibers installed in station sections the optical regions of which optical fibers differ from each other with respect to their composition and through which signal lights are amplified by stimulated Raman scattering.

An optical communication system according to another embodiment of the present invention is provided with optical transmission lined composed of a plurality of optical fibers being located at a station the optical regions of which optical fibers differ from each other with respect to their composition and through which signal lights are amplified by stimulated Raman scattering.

The above and further objects and novel features of the invention will be more fully clarified from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENTS

Figure 1:
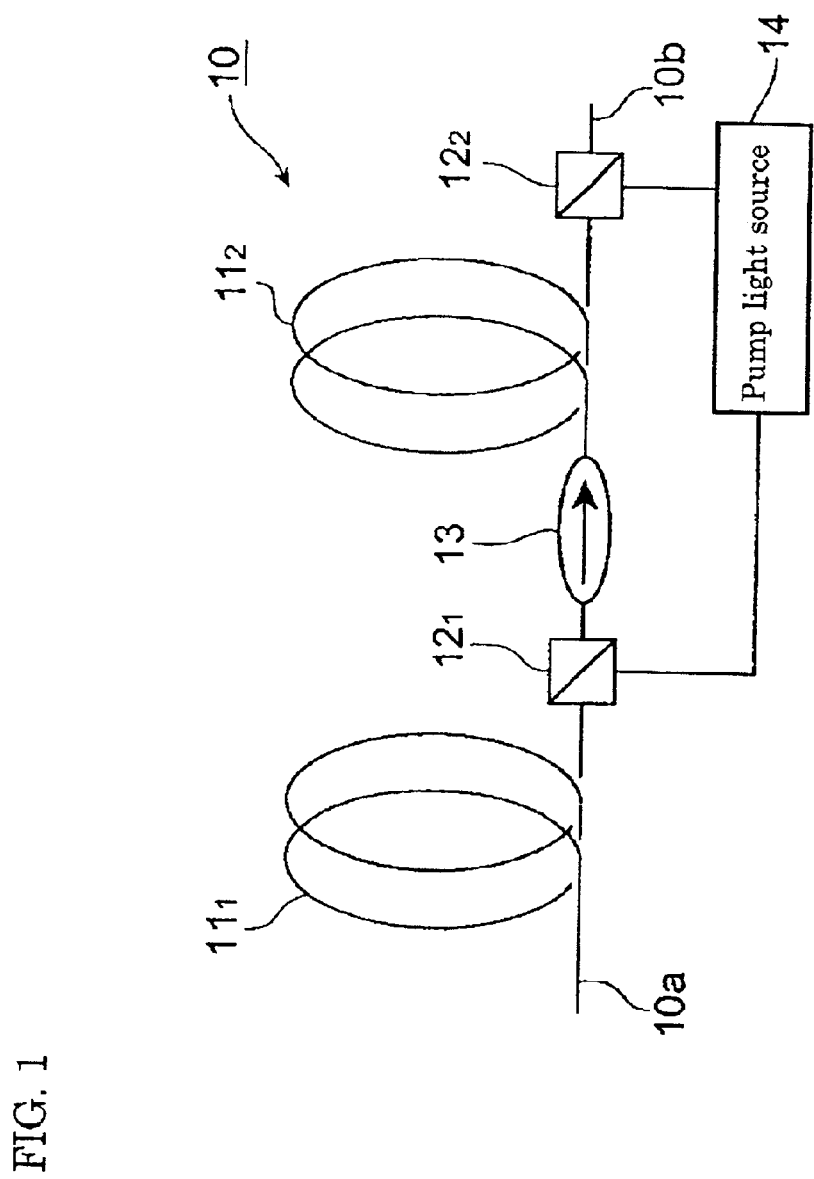
FIG. 1 is a schematic diagram of a gain module 10 according to a first embodiment of the present invention.

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted. The dimensions in the drawings are partly exaggerated and do not always correspond to actual ratios of dimensions.

(First Embodiment of the Gain Module)

FIG. 1 is a schematic diagram of a gain module 10 according to a first embodiment of the present invention. The gain module 10 is provided with a first optical fiber $11_1$ for Raman amplification, a first multiplexer/demultiplexer $12_1$, an optical isolator 13, a second optical fiber $11_2$ for Raman amplification, and a second multiplexer/demultiplexer $12_2$ from an input end 10a to an output end 10b in the enumerated order. In addition, the gain module 10 is provided with a pump light source 14 that is connected to both the first multiplexer/demultiplexer $12_1$ and the second multiplexer/demultiplexer $12_2$.

The pump light source 14 outputs pump light for Raman amplification. The first multiplexer/demultiplexer $12_1$ supplies the pump light to the first optical fiber $11_1$ for Raman amplification. It also allows the signal lights, which have reached it from the first optical fiber $11_1$ for Raman amplification, to pass to the optical isolator 13. The second multiplexer/demultiplexer $12_2$ supplies the pump light to the second optical fiber $11_2$ for Raman amplification. It also allows the signal lights, which have reached it from the second optical fiber $11_2$ for Raman amplification, to pass toward the output end 10b. The multiplexer/demultiplexer $12_1$ may be a fiber optic coupler, interference filter, or planer waveguides.

The first optical fiber $11_1$ for Raman amplification transmits signal lights, which have been input from the input end 10a, toward the first multiplexer/demultiplexer $12_1$, and also Raman-amplifies the signal lights as a result of the pump light being supplied thereinto. The optical isolator 13 allows light to pass in the direction from the first multiplexer/demultiplexer $12_1$ to the second optical fiber $11_2$ for Raman amplification, but does not allow the light to pass in the opposite direction. The second optical fiber $11_2$ for Raman amplification transmits signal lights, which have been input from the optical isolator 13, toward the second multiplexer/demultiplexer $12_2$, and amplifies the signal lights as a result of the pump light being supplied thereinto.

The pump light that has been output from the pump light source 14 is branched into two to be supplied to the first optical fiber $11_1$ for Raman amplification via the first multiplexer/demultiplexer $12_1$ and to the second optical fiber $11_2$ for Raman amplification via the second multiplexer/demultiplexer $12_2$. Then, the signal lights, which have been input to the input end 10a, propagate through the first optical fiber $11_1$ for Raman amplification while they are being Raman-amplified, pass through the first multiplexer/demultiplexer $12_1$ and the optical isolator 13, then propagate through the second optical fiber $11_2$ for Raman amplification while they are being Raman-amplified, and are emitted from the output end 10b via the second multiplexer/demultiplexer $12_2$.

The two optical fibers $11_1$ and $11_2$ for Raman amplification differ from each other with respect to the composition of their respective optical region and they are connected in series. Pump light having a substantially identical wavelength that has been output from the common pump light source 14 is supplied to each of these optical fibers. Because the respective Stokes shift of these optical fibers differs from each other, the gain of Raman amplification is in a different wavelength range in each of these optical fibers.

Figure 2:
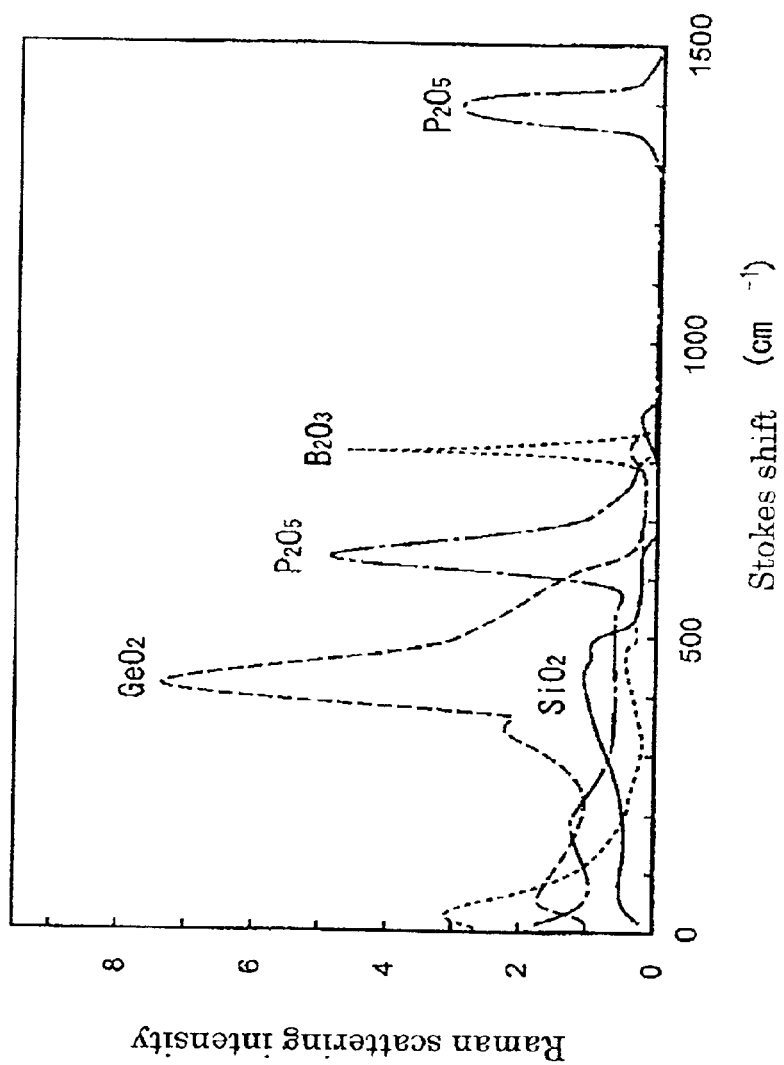
FIG. 2 is a graph showing the relationship between Stokes shift and Raman scattering intensity with respect to each composition of optical fibers.

FIG. 2 is a graph showing the relationship between Stokes shift and Raman scattering intensity with respect to each composition of the optical fibers. The Stokes shift in which Raman scattering intensity becomes the maximum differs depending on the composition. For example, in the case of $GeO_2$, the Raman scattering intensity becomes the greatest when the Stokes shift is about 420 $cm^{-1}$, and in the case of $P_2O_5$, the intensity is the greatest at the Stokes shift of about 635 $cm^{-1}$. In the case of $B_2O_3$, the intensity becomes the greatest at the Stokes shift of about 825 $cm^{-1}$. When such Stokes shift is expressed in terms of a wavelength unit, in the case of $GeO_2$, it is 100 nm, in the case of $P_2O_5$, 140 nm, and in the case of $B_2O_3$, 180 nm, with respect to the pump light of 1400 nm, respectively.

Figure 3:
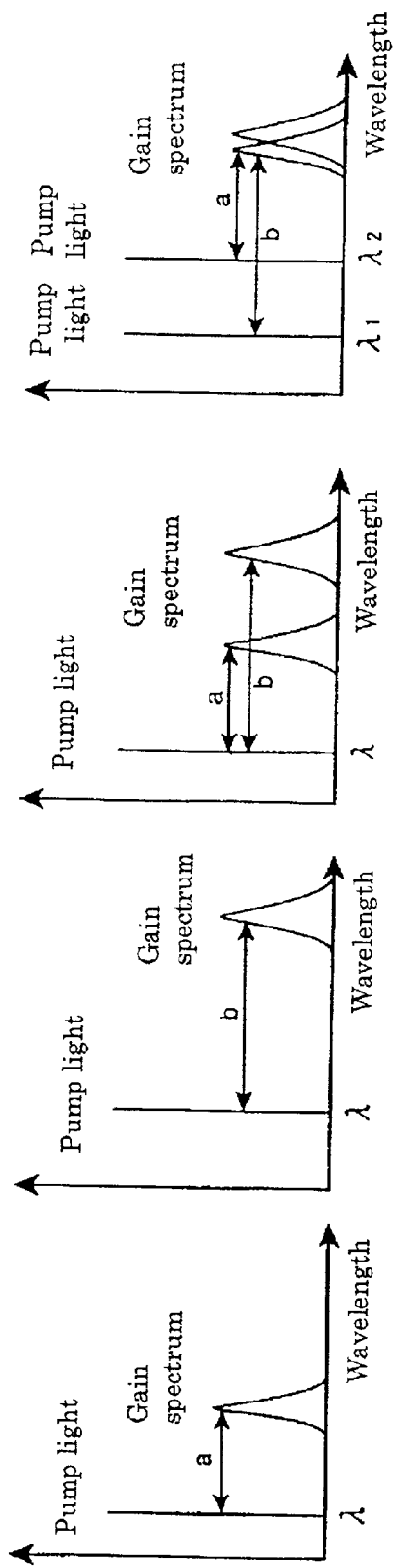
FIG. 3 is a graph showing the relationship between the wavelength of pump light and the gain of Raman amplification.

FIG. 3 is a graph showing the relationship between the wavelength of pump light and the gain of Raman amplification. FIG. 3(a) shows that the Stokes shift of the first optical fiber $11_1$ for Raman amplification is a, and that the optical fiber $11_1$ has gain, centering around the wavelength that is longer than the wavelength $\lambda$ of the pump light by a. Similarly, FIG. 3(b) shows that the second optical fiber $11_2$ for Raman amplification has gain, centering around the wavelength that is longer than the wavelength $\lambda$ of the pump light by b. In this case, when the first optical fiber $11_1$ for Raman amplification and the second optical fiber $11_2$ for Raman amplification are connected in series so as to constitute the gain module 10, and the pump light of wavelength $\lambda$ is supplied to the optical fibers $11_1$ and $11_2$ for Raman amplification, as shown in FIG. 3(c), the gain of the gain module 10 equals the sum of each gain of the optical fibers $11_1$ and $11_2$ for Raman amplification.

For example, the first optical fiber $11_1$ for Raman amplification may be a silica-based optical fiber whose optical region was doped with $GeO_2$, and the second optical fiber $11_2$ for Raman amplification may be a silica-based optical fiber whose optical region is doped with $P_2O_5$. In this way, the first optical fiber for Raman amplification will have gain, centering around the wavelength (Stokes shift quantity of 420 $cm^{-1}$) which is 100 nm longer than the pump light wavelength (1400 nm), and the second optical fiber for Raman amplification will have gain, centering around the wavelength (Stokes shift quantity of 635 $cm^{-1}$) which is 140 nm longer than the pump light wavelength. Then, the gain module 10 will have gain in a wavelength range which includes both wavelengths (Stokes shift quantity difference of 215 $cm^{-1}$) which are longer than the pump light wavelength by 100 nm and 140 nm, respectively, and consequently will be able to amplify the signal lights in a broader wavelength range (not less than 200 $cm^{-1}$) than in the conventional case where only one kind of optical fiber for Raman amplification is used.

The first optical fiber $11_1$ for Raman amplification may be placed in a transmission line that connecting a transmitting station, a receiving station, and a repeater station with each other, or may be installed in the form of coils inside a station. The second optical fiber $11_2$ for Raman amplification preferably may be installed in the form of coils inside a station.

As described above, the gain module 10 according to the first embodiment is able to achieve the expansion of the wavelength width for Raman amplification gain by using only one pump light source, and has the advantage of low cost as compared with the Raman amplifier described in Literature (1) in which an attempt is made expand the wavelength width for gain by providing many pump light sources.

Also, in the present embodiment, an optical multiplexer and demultiplexer are unnecessary because the first optical fiber $11_1$ and the second optical fiber $11_2$ are connected in series, and hence a Raman amplifier can be made at a cost lower than in the case of parallel connection.

(Second Embodiment of the Gain Module)

Figure 4:
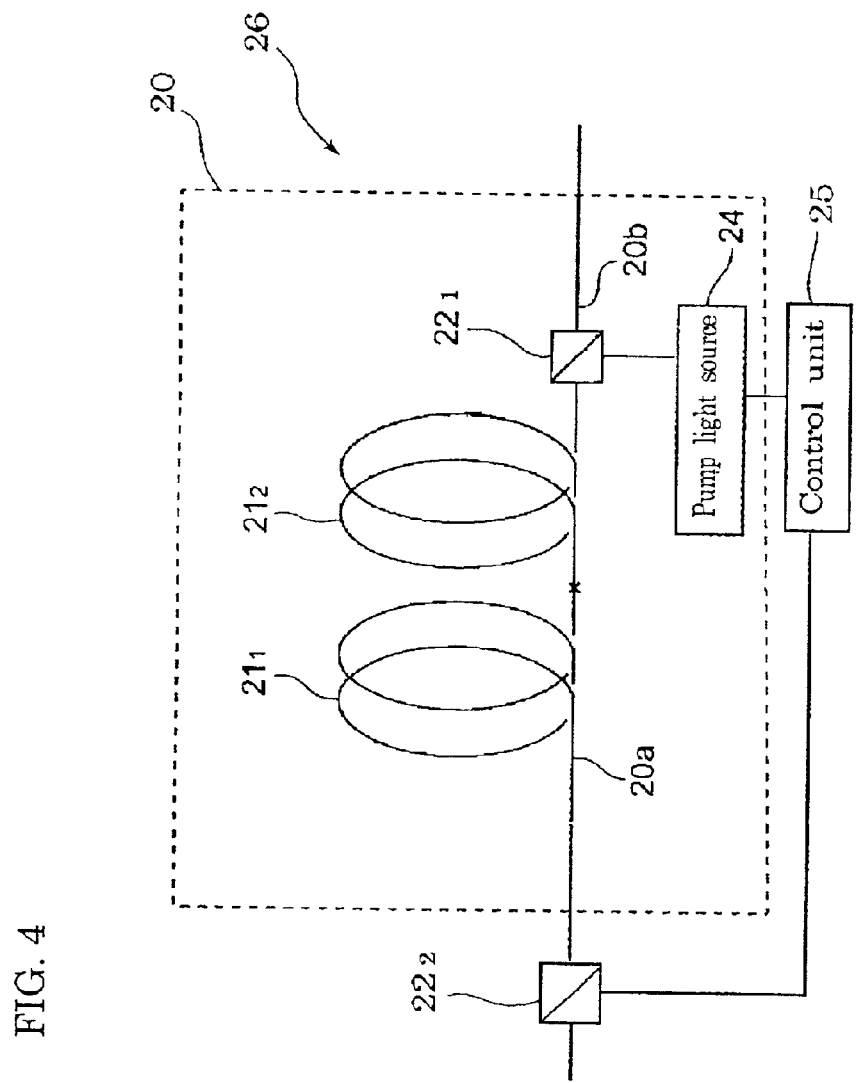
FIG. 4 is a schematic diagram of a gain module 20 according to a second embodiment of the present invention.

FIG. 4 is a schematic diagram of a gain module 20 according to a second embodiment of the present invention. The gain module 20 is provided with a first optical fiber $21_1$ for Raman amplification, a second optical fiber $21_2$ for Raman amplification, and a first multiplexer/demultiplexer $22_1$, in the enumerated order from an input end 20a to an output end 20b. The gain module 20 is also provided with a pump light source 24 that is connected with a first multiplexer/demultiplexer $22_1$. A Raman amplifier 26 is provided with this gain module 20, control unit 25, and a second multiplexer/demultiplexer $22_2$.

The pump light source 24 outputs pump light for Raman amplification. The first multiplexer/demultiplexer $22_1$ supplies pump light to both the first optical fiber $21_1$ for Raman amplification and the second optical fiber $21_2$ for Raman amplification, and allows signal lights, which have reached it from the second optical fiber $21_2$ for Raman amplification, to pass toward the output end $20b$.

Signal lights which are input to the input end $20a$ are demultiplexed by the second multiplexer/demultiplexer $22_2$ and a power of a predetermined wavelength signal light is monitored by a control unit $25$. The control unit $25$ controls the pump light source $24$ such that the output power of the gain module $20$ may be a predetermined value.

The first optical fiber $21_1$ for Raman amplification transmits signal lights, which have been input from the input end $20a$, toward the second optical fiber $21_2$ for Raman amplification, and also Raman-amplifies the signal lights as a result of pump light being supplied thereinto. The second optical fiber $21_2$ for Raman amplification transmits signal lights, which have been input from the first optical fiber $21_1$ for Raman amplification, toward the first multiplexer/demultiplexer $22_2$, and also Raman-amplifies the signal lights as a result of pump light being supplied thereinto.

In the gain module $20$, the pump light that has been output from the pump light source $24$ is supplied to both the first optical fiber $21_1$ for Raman amplification and the second optical fiber $21_2$ for Raman amplification via the first multiplexer/demultiplexer $22_1$. Then, the signal lights that have been input to the input end $20a$ propagate through the first optical fiber $21_1$ for Raman amplification and the second optical fiber $21_2$ for Raman amplification while they are being Raman-amplified, and are emitted from the output end $20b$ via the first multiplexer/demultiplexer $22_1$.

In the gain module $20$, the two optical fibers $21_1$ and $21_2$ for Raman amplification differ from each other with respect to the composition of their respective optical region, and they are connected in series. Pump light of substantially identical wavelength that has been output from the common pump light source $24$ is supplied to each of them. Because their respective Stokes shift differs from each other, they have the gain of Raman amplification in a different wavelength range, respectively.

For example, the first optical fiber $21_1$ for Raman amplification may be a silica-based optical fiber whose optical region is doped with $GeO_2$, and the second optical fiber $21_2$ for Raman amplification may be a silica-based optical fiber whose optical region is doped with $B_2O_3$. In this way, the first optical fiber for Raman amplification has gain, centering around the wavelength (Stokes shift quantity 420 cm$^{-1}$) which is 100 nm longer than the pump light wavelength (1400 nm), and the second optical fiber for Raman amplification has gain, centering around the wavelength (Stokes shift quantity 825 cm$^{-1}$) which is 180 nm longer than the pump light wavelength. Then, the gain module $20$ has gain in the range which includes both of the wavelengths (Stokes shift quantity difference 405 cm$^{-1}$) which are longer than the pump light wavelength by 100 nm and 180 nm, and signal lights can be amplified in a broader wavelength range (equal to or more than 400 cm$^{-1}$) than the conventional case in which only one kind of optical fiber for Raman amplification is used. The first optical fiber $21_1$ for Raman amplification and the second optical fiber $21_2$ for Raman amplification may be installed in a transmission line that connects a transmitting station, a receiving station, and a repeater station with each other, or they may be placed in the form of coils in a station. The gain module $20$ has a similar effect as the gain module $10$ according to the first embodiment.

(Third Embodiment of the Gain Module)

Figure 5:
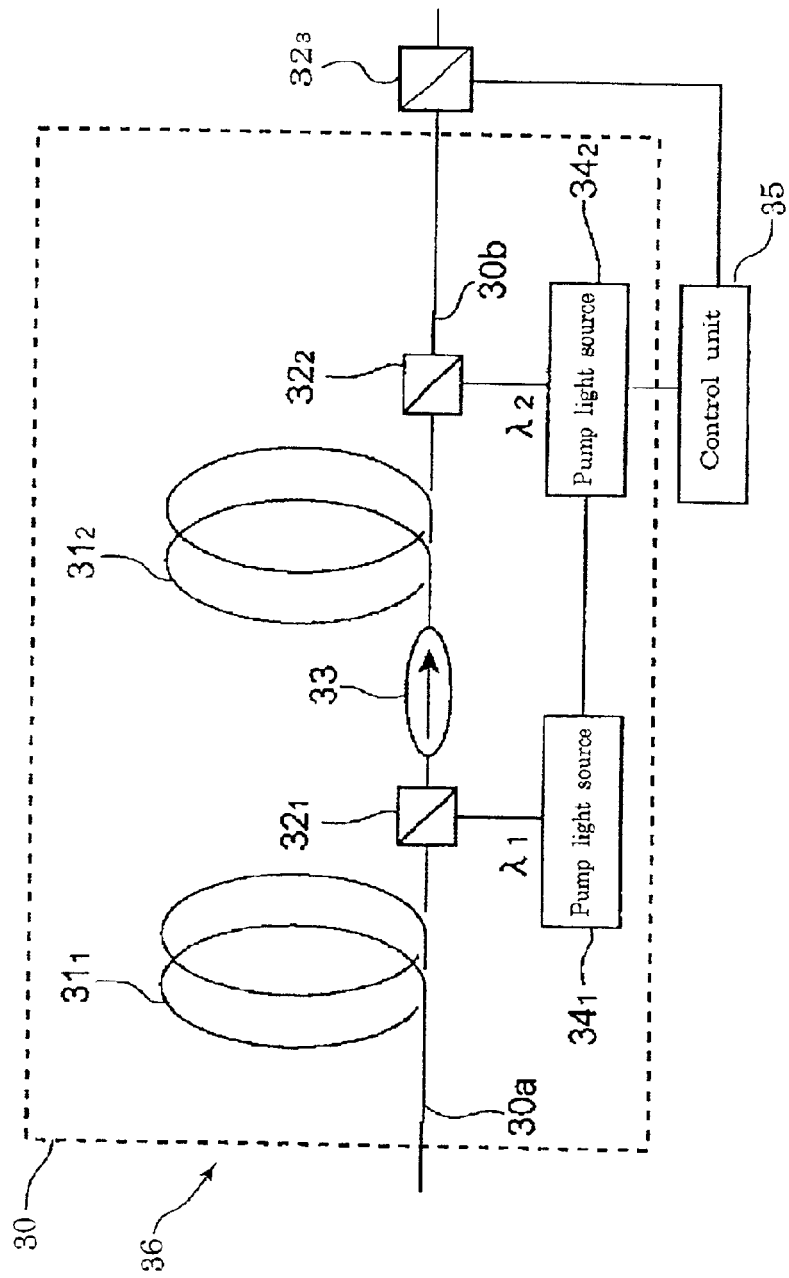
FIG. 5 is a schematic diagram of a gain module 30 according to a third embodiment of the present invention.

FIG. 5 is a schematic diagram of a gain module $30$ according to a third embodiment of the present invention. The gain module $30$ is provided with a first optical fiber $31_1$ for Raman amplification, a first multiplexer/demultiplexer $32_1$, an optical isolator $33$, a second optical fiber $31_2$ for Raman amplification, and a second multiplexer/demultiplexer $32_2$ from an input end $30a$ to an output end $30b$ in the enumerated order. The gain module $30$ is also provided with a first pump light source $34_1$ that is connected to a first multiplexer/demultiplexer $32_1$ and a second pump light source $34_2$ that is connected to a second multiplexer/demultiplexer $32_2$. A Raman amplifier $36$ is provided with this gain module $30$, control unit $35$, and a third multiplexer/demultiplexer $32_3$.

The first pump light source $34_1$ and the second pump light source $34_2$, respectively, output pump light for Raman amplification. The first multiplexer/demultiplexer $32_1$ supplies pump light, which has been output from the first pump light source $34_1$, to the first optical fiber $31_1$ for Raman amplification, and also allows signal lights, which have reached it from the first optical fiber $31_1$ for Raman amplification, to pass toward the optical isolator $33$. The second multiplexer/demultiplexer $32_2$ supplies pump light, which has been output from the second pump light source $34_2$, to the second optical fiber $31_2$ for Raman amplification, and also allows signal lights, which have reached it from the second optical fiber $31_2$ for Raman amplification, to pass toward the output end $30b$.

Signal lights which are output from the output end $20b$ are demultiplexed by the third multiplexer/demultiplexer $32_3$ and a power of a predetermined wavelength signal light is monitored by a control unit $35$. The control unit $35$ controls the pump light source $34_2$ such that the output power of the gain module $30$ may be a predetermined value.

The first optical fiber $31_1$ for Raman amplification transmits signal lights, which have been input from the input end $30a$, toward the third multiplexer/demultiplexer $32_1$, and also Raman-amplifies the signal lights as a result of pump light being supplied thereinto. The optical isolator $33$ allows light to pass in the direction from the first multiplexer/demultiplexer $32_1$ to the second optical fiber $31_2$ for Raman amplification but does not allow the light to pass in the opposite direction. The second optical fiber $31_2$ for Raman amplification transmits signal lights, which have been input from the optical isolator $33$, toward the second multiplexer/demultiplexer $32_2$, and also Raman-amplifies the signal lights as a result of pump light being supplied thereinto.

In the gain module $30$, the pump light that has been output from the first pump light source $34_1$ is supplied to the first optical fiber $31_1$ for Raman amplification, and the pump light that has been output from the second pump light source $34_2$ is supplied to the second optical fiber $31_2$ for Raman amplification. Then, signal lights that have been input to the input end $30a$ propagate through the first optical fiber $31_1$ for Raman amplification while they are being Raman-amplified, pass through the first multiplexer/demultiplexer $32_1$ and the optical isolator $33$, propagate through the second optical fiber $31_2$ for Raman amplification while they are being Raman-amplified, and are emitted from the output end $30b$ via the second multiplexer/demultiplexer $32_2$.

Especially, in the gain module $30$, the two optical fibers $31_1$ and $31_2$ for Raman amplification differ from each other with respect to the composition of their respective optical region, and they are connected in series. Because the optical fibers $31_1$ and $31_2$ for Raman amplification differ from each other with respect to the composition of their respective optical region including a core region, their Stokes shifts differ from each other. By way of example, the first optical fiber $31_1$ for Raman amplification may be a silica-based optical fiber whose optical region is doped with $GeO_2$, and the second optical fiber $31_2$ for Raman amplification may be a silica-based optical fiber whose optical region is doped with $P_2O_5$.

The wavelength $\lambda_1$ of the pump light supplied to the first optical fiber $31_1$ for Raman amplification and the wavelength $\lambda_2$ of the pump light supplied to the second optical fiber $31_2$ for Raman amplification may be identical or may differ from each other.

When the wavelength $\lambda_1$ and the wavelength $\lambda_2$ are the same, the optical fibers $31_1$ and $31_2$ for Raman amplification have the gain of Raman amplification respectively in a different wavelength range as in the case of the first or second embodiment. As a result, the gain module 30 can amplify signal lights in a wavelength range broader than in the conventional case that uses only one kind of an optical fiber for Raman amplification.

On the other hand, when the wavelength $\lambda_1$ and wavelength $\lambda_2$ are different from each other, the gain module 30 has the gain of Raman amplification within a wavelength range according to respective compositions of the optical fiber $31_1$ and $31_2$ for Raman amplification and the wavelength of the pump light. By choosing a suitable wavelength of pump light, the respective wavelength ranges having the gain of Raman amplification of the optical fibers $31_1$ and $31_2$ for Raman amplification can be further separated from each other or can partly overlap each other. (Refer to FIG. 3(d)). As a result, the expansion and adjusting of the wavelength range having gain can easily be done.

The first optical fiber $31_1$ for Raman amplification and the second optical fiber $31_2$ for Raman amplification may be installed in a transmission line connecting a transmitting station, a receiving station, and a repeater station each other, or they may be placed in the form of coils in a station.

As described above, the gain module 30 according to the present embodiment is advantageous in that the expansion and adjustment of the wavelength width having the gain of Raman amplification can be done by using only two pump light sources and hence is low cost.

(Fourth Embodiment of the Gain Module)

Figure 6:
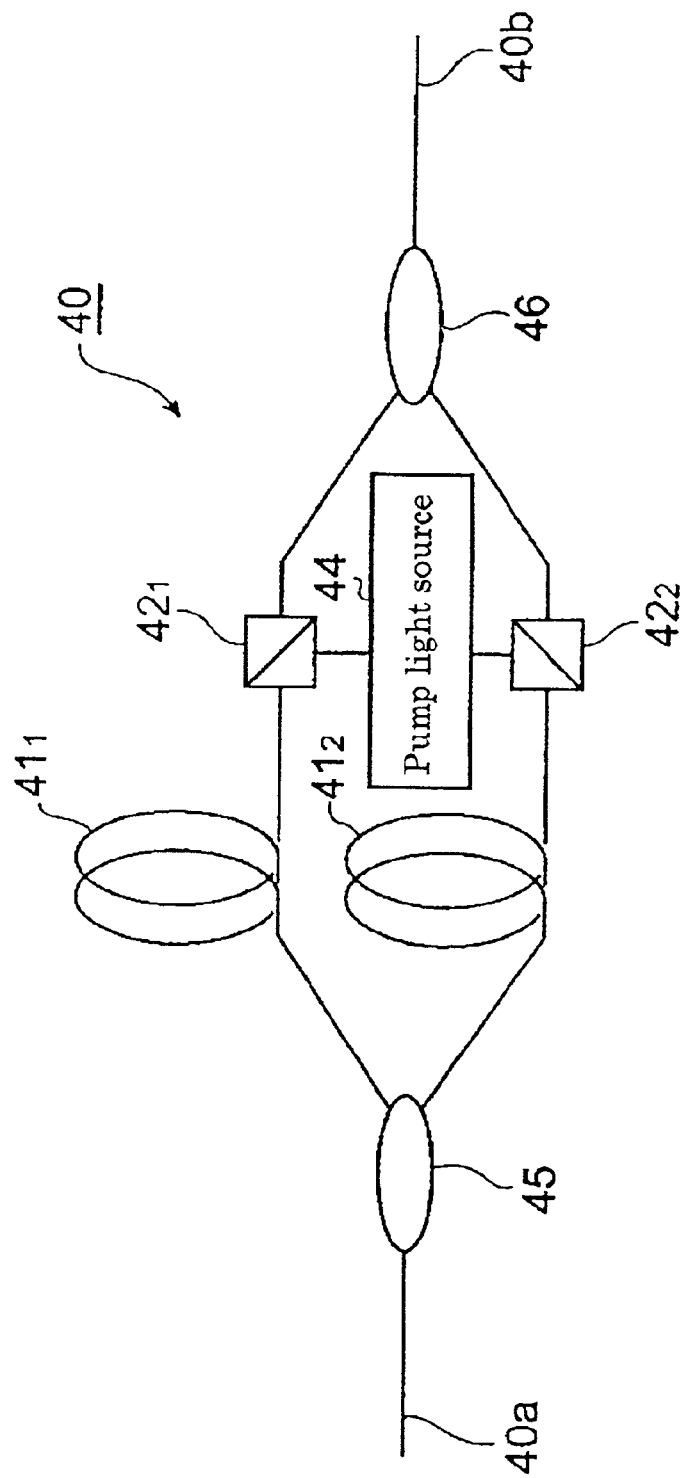
FIG. 6 is a schematic diagram of a gain module 40 according to a fourth embodiment of the present invention.

FIG. 6 is a schematic diagram of a gain module 40 according to a fourth embodiment of the present invention.

The gain module 40 is provided with a first optical fiber $41_1$ for Raman amplification and a second optical fiber $41_2$ for Raman amplification which are connected together in parallel, and a demultiplexer 45 is positioned between these optical fibers and an input end 40a. Furthermore, between these optical fibers and an output end 40b there are provided multiplexer/demultiplexers $42_1$ and $42_2$ and an optical multiplexer 46. In addition, the gain module 40 is provided with a pump light source 44 that is connected to both the first multiplexer/demultiplexer $42_1$ and the second multiplexer/demultiplexer $42_2$.

The pump light source 44 outputs pump light for Raman amplification. The first multiplexer/demultiplexer $42_1$ supplies pump light to the first optical fiber $41_1$ for Raman amplification, and also allows signal lights, which have reached it from the first optical fiber $41_1$ for Raman amplification, to pass toward the optical multiplexer 46. The second multiplexer/demultiplexer $42_2$ supplies pump light to the second optical fiber $41_2$ for Raman amplification, and also allows signal lights, which have reached it from the second optical fiber $41_2$ for Raman amplification, to pass toward the optical multiplexer 46.

The demultiplexer 45 demultiplexes signal lights, which have been input from an input end 40a, into a first spectrum band and a second spectrum band, and outputs the signal lights in the first spectrum band to the first optical fiber $41_1$ for Raman amplification and outputs the signal lights in the second spectrum band to the second optical fiber $41_2$ for Raman amplification. The first optical fiber $41_1$ for Raman amplification transmits the signal lights in the first spectrum band toward the first multiplexer/demultiplexer $42_1$, and also Raman-amplifies the signal lights as a result of pump light being supplied thereinto. The second optical fiber $41_2$ for Raman amplification transmits signal lights in the second spectrum band toward the second multiplexer/demultiplexer $42_2$, and also Raman-amplifies the signal lights as a result of pump light being supplied thereinto. The optical multiplexer 46 multiplexes the signal lights in the first spectrum band and the signal lights in the second spectrum band, and outputs the multiplexed signal lights toward the output end 40b.

In the gain module 40, the pump light that has been output from the pump light source 44 is branched into two to be supplied to the first optical fiber $41_1$ for Raman amplification and the second optical fiber $41_2$ for Raman amplification. Then, the signal lights that have been input into an input end 40a are demultiplexed by the demultiplexer 45 into a first spectrum band and a second spectrum band. The signal lights in the first spectrum band propagate through the first optical fiber $41_1$ for Raman amplification while they are being Raman-amplified and travel toward the optical multiplexer 46 via the first multiplexer/demultiplexer $42_1$. The signal lights in the second spectrum band propagate through the second optical fiber $41_2$ for Raman amplification while they are being Raman-amplified and travel toward the optical multiplexer 46 via the second multiplexer/demultiplexer $42_2$. The signal lights in the first and second spectrum bands are multiplexed by the optical multiplexer 46 and are emitted from the output end 40b.

Especially, in the gain module 40, the two optical fibers $41_1$ and $41_2$ for Raman amplification differ from each other with respect to the composition of their respective optical region, and they are connected in parallel. Each of these optical fibers is supplied with pump light of a substantially identical wavelength that has been output from a common pump light source 44. Because their respective Stokes shift differs from each other, their gain of Raman amplification respectively is in a different wavelength range.

By way of example, the first optical fiber $41_1$ for Raman amplification may be a silica-based optical fiber whose optical region is doped with $GeO_2$, and the second optical fiber $41_2$ for Raman amplification may be a silica-based optical fiber whose optical region is doped with $P_2O_5$. The first optical fiber $41_1$ for Raman amplification and the second optical fiber $41_2$ for Raman amplification may preferably be placed in the form of coils in a station. In the present embodiment, pump light of a substantially identical wavelength is supplied to both of the optical fibers $41_1$ and $41_2$ for Raman amplification, but pump light for Raman amplification of a different wavelength may be supplied to each of them.

The gain module 40 also can attain the gain of Raman amplification in a wider wavelength range, using only one pump light source and hence is of low cost as compared with the Raman amplifier that is equipped with numerous pump light sources as described in Literature (1).

(Embodiment of Optical Communication System)

Figure 7:
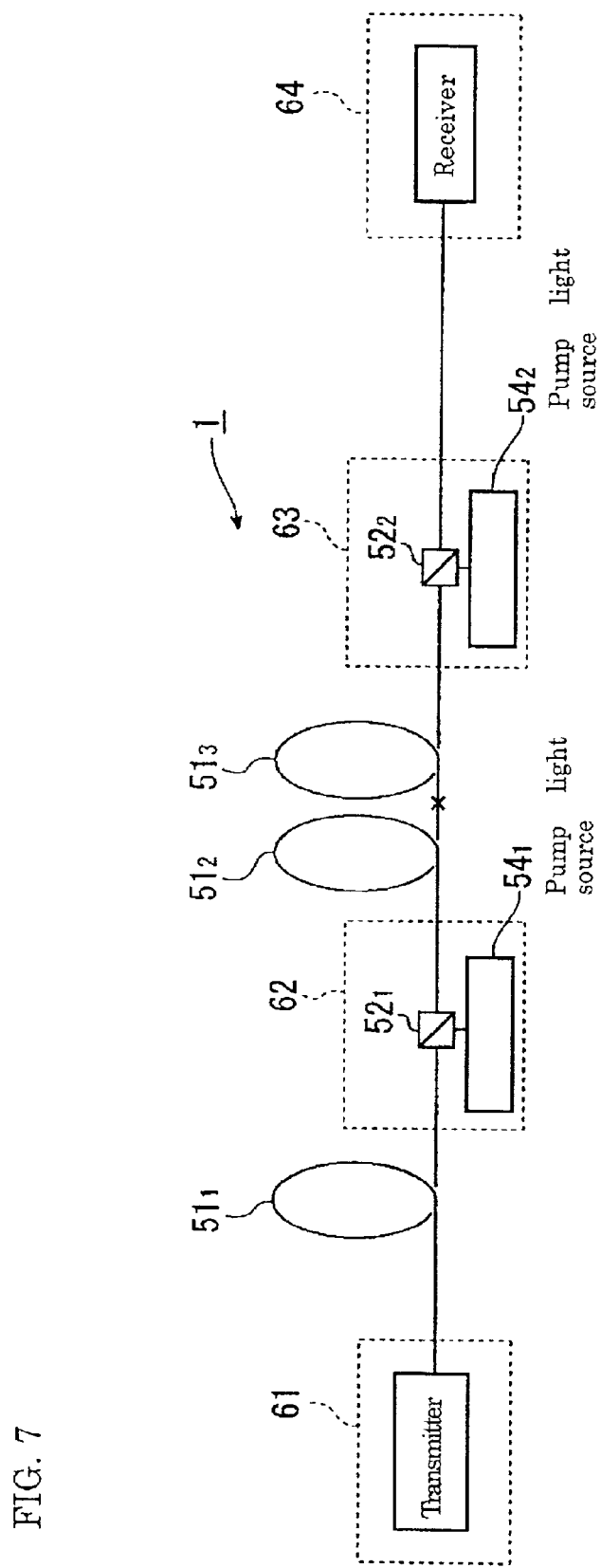
FIG. 7 is a schematic diagram of an optical communication system 1 according to an embodiment of the present invention.

FIG. 7 is a schematic diagram of an optical communication system 1 according to an embodiment of the present invention. The optical communication system 1 is composed of optical transmission lines connecting a transmitting station 61 and a repeater station 62, a repeater station 62 and a repeater station 63, and a repeater station 63 and a receiving station 64 (A section between these stations is generically called a "station section").

The optical transmission line between the transmitting station 61 and the repeater station 62 is made of an optical fiber 51₁ for Raman amplification. The optical transmission line between the repeater station 62 and the repeater station 63 is made of optical fibers 51₂ and 51₃ for Raman amplification. The repeater station 62 is provided with a pump light source 54₁ that outputs pump light for Raman amplification and a multiplexer/demultiplexer 52₁ for introducing the pump light, which has been output from the pump light source 54₁, into the optical fiber 51₁ for Raman amplification. The repeater station 63 is provided with a pump light source 54₂ that outputs pump light for Raman amplification and a multiplexer/demultiplexer 52₂ for introducing the pump light, which has been output from the pump light source 54₂, into the optical fibers 51₂ and 51₃ for Raman amplification. That is, the optical fiber 51₁ for Raman amplification, the pump light source 54₁, and multiplexer/demultiplexer 52₁ constitute a gain module. Also, the optical fibers 51₂ and 51₃ for Raman amplification, the pump light source 54₂, and the multiplexer/demultiplexer 52₂ constitute a gain module.

In the optical communication system 1, the pump light for Raman amplification that has been output from the pump light source 54₁ in the repeater station 62 is supplied to the optical fiber 51₁ for Raman amplification via the multiplexer/demultiplexer 52₁. The pump light that has been output from the pump light source 54₂ in the repeater station 63 is supplied to the optical fibers 51₂ and 51₃ for Raman amplification via the multiplexer/demultiplexer 52₂. Then, signal lights that have been output from the transmitting station 61 propagate through the optical fiber 51₁ for Raman amplification toward the repeater station 62 while they are being Raman-amplified, and further propagate through the optical fibers 51₂ and 51₃ for Raman amplification toward the repeater station 63 while they are being Raman-amplified, and further propagate through the optical transmission line to the receiving station 64 until they are received at the receiving station 64.

Especially, in the optical communication system 1, the three optical fibers 51₁ through 51₃ for Raman amplification differ from each other with respect to the composition of their respective optical region, and they are connected in series. Pump light of a substantially identical wavelength that has been output from the common pump light source 54₂ is supplied to each of these optical fibers. Because their respective Stokes shift differ, they have the gain of Raman amplification in different wavelength ranges, respectively.

By way of example, any one of the optical fibers 51₁ through 51₃ for Raman amplification preferably may be a silica-based optical fiber whose optical region is doped with $GeO_2$, and any one of the other optical fibers preferably may be a silica-based optical fiber whose optical region is doped with $P_2O_5$. The gain of Raman amplification of the optical communication system 1 is the sum of each gain of the optical fibers 51₁ through 51₃ for Raman amplification, and accordingly the wavelength width having gain can be further broadened as compared with the case of a conventional optical communication system that is provided with only one kind of optical fiber for Raman amplification. As described above, the optical communication system 1 according to the present embodiment is low cost because the wavelength width that has the gain of Raman amplification can be expanded by using only three pump light sources.

In the present embodiment, the optical fiber for Raman amplification is installed between stations, but it may be placed inside a station in the form of coils.

What is claimed is:

1. A gain module comprising:
    a first optical fiber having a composition in its optical region,
    a second optical fiber having another composition in its optical region, and
    one or more pump light sources which supply pump light for Raman amplification to each of the first and second optical fibers,
    wherein said first and second optical fibers are connected in series and have different wavelength ranges for amplification, and
    through said first and second optical fibers signal lights are amplified by stimulated Raman scattering.

2. A gain module comprising:
    a first optical fiber having a composition in its optical region,
    a second optical fiber having another composition in its optical region, and
    one or more pump light sources which supply pump light for Raman amplification to each of the first and second optical fibers,
    wherein said first and second optical fibers are connected in series and have different wavelength ranges for amplification, and
    through said first and second optical fibers signal lights are amplified by stimulated Raman scattering;
    wherein the difference of Stokes shift quantity of said first and second optical fibers is equal to or more than 200 $cm^{-1}$.

3. A gain module comprising:
    a first optical fiber having a composition in its optical region,
    a second optical fiber having another composition in its optical region, and
    one or more pump light sources which supply pump light for Raman amplification to each of the first and second optical fibers,
    wherein said first and second optical fibers are connected in series and have different wavelength ranges for amplification, and
    through said first and second optical fibers signal lights are amplified by stimulated Raman scattering;
    wherein the difference of Stokes shift quantity of said first and second optical fibers is equal to or more than 400 $cm^{-1}$.

4. A gain module comprising:
    a plurality of optical fibers which differ from each other with respect to the composition of their respective optical regions and through which signal lights are amplified by stimulated Raman scattering; and
    one or more pump light sources which supply pump light for Raman amplification to each said plurality of optical fibers;
    wherein said plurality of optical fibers are connected in parallel.

5. A gain module according to claim 1, wherein said one or more pump light sources supply each of said first and second optical fibers with pump light of a substantially identical wavelength.

6. A gain module according to claim 1, wherein pump light that has been output from one pump light source is supplied to said first and second optical fibers.

7. A gain module comprising:

a plurality of optical fibers which differ from each other with respect to the composition of their respective optical regions and through which signal lights are amplified by stimulated Raman scattering; and one or more pump light sources which supply pump light for Raman amplification to each said plurality of optical fibers;

wherein said pump light source supplies pump light of a different wavelength to each of said plurality of optical fibers.

8. A gain module according to Claim 1, wherein the optical region of at least one of said first and second optical fibers is doped with $GeO_2$.

9. A gain module according to claim 1, wherein the optical region of at least one of said first and second optical fibers is doped with $P_2O_5$.

10. A Raman amplifier comprising:

a plurality of optical fibers which differ from each other with respect to the composition of their respective optical regions and through which signal lights are amplified by stimulated Raman scattering, wherein said plurality of optical fibers have different wavelength ranges for amplification;

one or more pump light sources which supply pump light for Raman amplification to each of said plurality of optical fibers; and a control unit.

11. An optical communication system comprising optical transmission lines installed in station sections and one or more pump light sources that supply pump light for Raman amplification to the optical transmission lines, said optical transmission lines comprising a plurality of optical fibers the optical regions of which differ from each other with respect to their composition and through which signal lights are amplified by stimulated Raman scattering, wherein said plurality of optical fibers have different wavelength ranges for amplification.

12. An optical communication system comprising:

a plurality of optical fibers which differ from each other with respect to the composition of their respective optical regions and through which signal lights are amplified by stimulated Raman scattering, wherein said plurality of optical fibers have different wavelength ranges for amplification; and a pump light source for supplying pump light for Raman amplification to each of said plurality of optical fibers, said plurality of optical fibers and said pump light source being located at a station.

13. A gain module according to claim 1, further comprising:

a first multiplexer located between said first and second optical fibers and introducing pump light into said first optical fiber and a second multiplexer located at the other end of said second optical fiber and introducing pump light into said second optical fiber.

14. A gain module according to claim 1, wherein said pump light is supplied to said first and second optical fibers from different pump light sources respectively.

15. A gain module comprising:

a first optical fiber having a composition in its optical region;

a second optical fiber having another composition in its optical region; and one or more pump light sources which supply pump light for Raman amplification to each of the first and second optical fibers;

wherein said first and second optical fibers are connected in series and have different wavelength ranges for amplification, and through said first and second optical fibers signal lights are amplified by stimulated Raman scattering; and said first and second optical fibers and said one or more pump light sources are located at a station.

* * * * *